US006498699B1

(12) United States Patent
Collins

(10) Patent No.: US 6,498,699 B1
(45) Date of Patent: Dec. 24, 2002

(54) TAPE TRANSPORT USING A CARRIER RIBBON

(75) Inventor: Gary W. Collins, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/453,245

(22) Filed: Dec. 2, 1999

(51) Int. Cl.[7] .............................................. G11B 15/26
(52) U.S. Cl. ........................................................ 360/90
(58) Field of Search ........................... 360/90, 85, 96.1, 360/96.2, 96.3, 96.4, 96.5, 122; 242/352.4, 334, 342, 332, 343.2, 192; 226/172

(56) References Cited

U.S. PATENT DOCUMENTS

| | | | |
|---|---|---|---|
| 3,609,021 A | 9/1971 | Gill | 352/78 R |
| 3,808,902 A | 5/1974 | Grant | 74/334 |
| 3,942,743 A | 3/1976 | Jinsenji | 242/342 |
| 3,974,982 A | 8/1976 | Stone | 242/352.4 |
| 3,984,049 A | 10/1976 | Shawen | 235/486 |
| 4,072,279 A | 2/1978 | Lewis | 242/332 |
| 4,172,569 A * | 10/1979 | Newell | 242/192 |
| 4,474,342 A | 10/1984 | Nater | 242/343.2 |
| 4,652,946 A * | 3/1987 | Ryan | 360/85 |
| 4,720,202 A | 1/1988 | Kawakami | 400/208 |
| 4,970,612 A | 11/1990 | Renders et al. | 360/95 |
| 5,199,660 A * | 4/1993 | Smith | 242/192 |
| 5,585,978 A * | 12/1996 | Rottenburg et al. | 360/85 |
| 5,699,972 A * | 12/1997 | Nawa | 242/334 |
| 5,872,692 A * | 2/1999 | Saito et al. | 360/122 |
| 6,283,396 B1 * | 9/2001 | Collins | 226/172 |

FOREIGN PATENT DOCUMENTS

| | | | |
|---|---|---|---|
| JP | 08096550 A | * | 4/1996 |
| JP | 9-81987 | * | 3/1997 |

* cited by examiner

Primary Examiner—David Davis
Assistant Examiner—Tianjie Chen
(74) Attorney, Agent, or Firm—Brooks & Kushman P.C.

(57) ABSTRACT

A tape transport system for positioning magnetic tape moving over a tape head is provided. The tape system includes a carrier ribbon having a width equal to the tape width. Passages through the carrier ribbon permit air, such as might otherwise trapped between the magnetic tape and the carrier ribbon, to pass through the carrier ribbon. At least one carrier ribbon guide is positioned on either side of the tape head. Each carrier ribbon guide has a channel of substantially the same width as the carrier ribbon for positioning the magnetic tape and the carrier ribbon across the tape head. A ribbon drive moves the carrier ribbon past the ribbon guides.

15 Claims, 4 Drawing Sheets

TAPE TRANSPORT USING A CARRIER RIBBON

TECHNICAL FIELD

The present invention relates to guiding magnetic tape past a tape access head.

BACKGROUND ART

Magnetic tape is commonly used to store voice and data information due to its reliability, cost efficiency, and ease of use. One way in which magnetic tape may be made more useful and cost effective by increasing the density of information stored on the magnetic tape. One method of increasing information density is to decrease the thickness of the tape thereby permitting more tape to be stored in a given volume. Another way of improving magnetic tape storage is to increase the rate of information transfer. This may be accomplished by increasing the speed at which the tape passes the tape access head.

Decreasing the thickness of magnetic tape creates difficulties in a tape transport system. Thin tape stretches, increasing the possibility of read and write errors. Tape stretching is exacerbated by complex tape transport systems which require more tension on the tape. Thin tape also may require mechanical support within the tape transport system to prevent folding, kinking, creasing, curling and other mechanical damage. Further, thin tape is more easily skewed relative to the tape head.

Various tape transport techniques have been proposed. Some of these solutions use a belt or carrier ribbon to support the tape along some portion of the tape path. Previous belt techniques, however, typically fail to provide one or more features necessary for thin, rapidly moving tape. A first feature is to provide support for the magnetic tape to prevent damage. A second feature is to guide the magnetic tape into proper position and alignment with the tape head. A third feature is to dissipate air that may be trapped when the tape contacts the belt.

What is needed is an effective tape transport system for thin tape. The tape transport system must be able to move magnetic tape past the tape head without stretching or mechanical damage. The tape should also be properly aligned with the tape head. The tape transport system should further be simple, inexpensive, and easy to maintain.

DISCLOSURE OF INVENTION

It is an object of the present invention to guide thin magnetic tape past a tape head.

It is another object of the present invention to position magnetic tape relative to the tape head.

It is still another object of the present invention to protect magnetic tape along the tape path.

It is yet another object of the present invention to reduce the complexity of the tape path.

In carrying out the above objects and other objects and features of the present invention, a tape transport system for positioning magnetic tape moving over a tape head is provided. The tape system includes a carrier ribbon having a width equal to the tape width. Passages through the carrier ribbon permit air, such as might otherwise trapped between the magnetic tape and the carrier ribbon, to pass through the carrier ribbon. At least one carrier ribbon guide is positioned on either side of the tape head. Each carrier ribbon guide has a channel of substantially the same width as the carrier ribbon for positioning the magnetic tape and the carrier ribbon across the tape head. A ribbon drive moves the carrier ribbon past the ribbon guides.

In an embodiment of the present invention, the carrier ribbon is formed in a continuous loop.

In an another embodiment of the present invention, the carrier ribbon drives the tape at the tape speed past the tape head.

In still another embodiment of the present invention, the tape transport system includes at least one lift-off pin operative to move the magnetic tape and the carrier ribbon away from the tape head such as, for example, during high speed rewind.

In yet another embodiment of the present invention, the tape transport system includes at least one air jet nozzle for moving the magnetic tape and the carrier ribbon away from the tape head.

A method of transporting magnetic tape past the tape head is also provided. The method includes driving a carrier ribbon in the tape direction. The tape contacts a carrier ribbon in a region of the tape path prior to the tape head. Any air that would otherwise be trapped between the magnetic tape and the carrier ribbon passes through the carrier ribbon. The magnetic tape is guided past the tape head. The tape separates from the carrier ribbon in a region of the tape path after the tape head.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
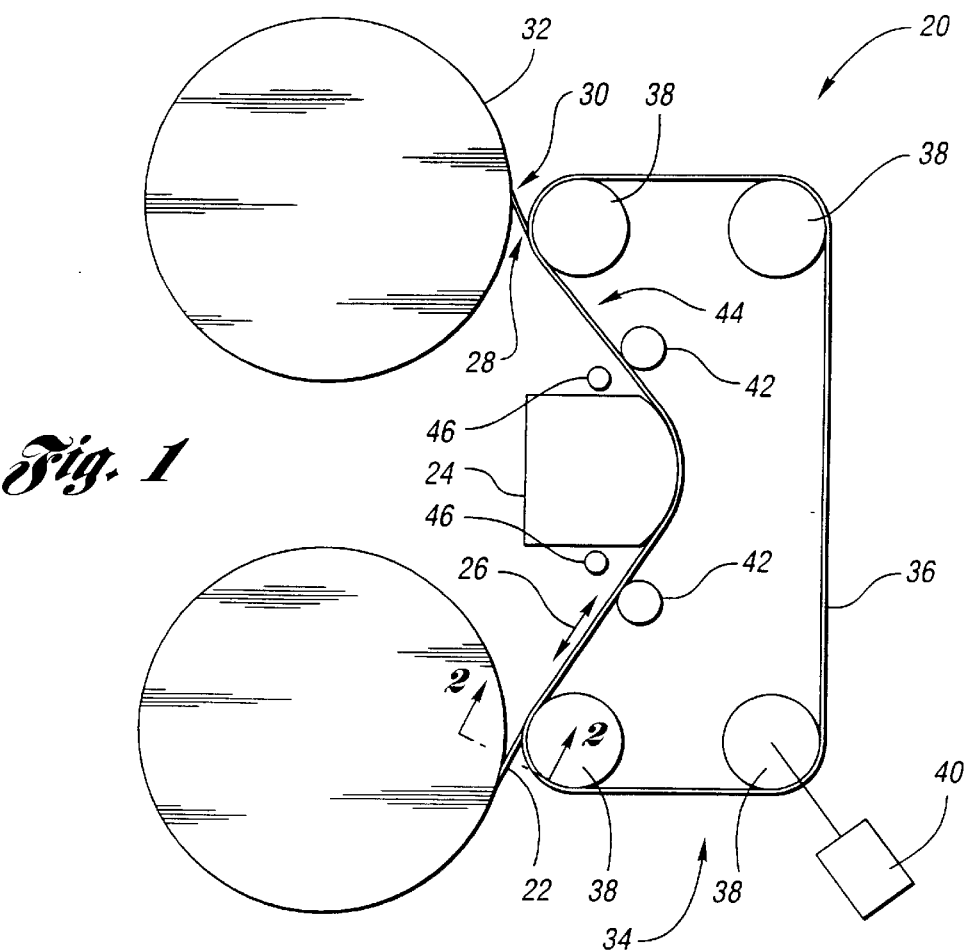
FIG. 1 is a schematic drawing of a tape transport system with a carrier ribbon according to an embodiment of the present invention.

Referring to FIG. 1, a schematic diagram of a tape transport system with a carrier ribbon according to an embodiment of the present invention is shown. A tape transport system, shown generally by 20, moves magnetic tape 22 past tape head 24 in either tape direction 26. Tape 22 has active side 28 onto which data can be written or from which data can be read by head 24. Opposite active side 28 is passive side 30. Tape 22 travels between two reels 32. Reels 32 may be contained within a tape cassette. Alternatively, one or both of reels 32 may be held within a tape cartridge. As will be recognized by one of ordinary skill in the art, the present invention will operate with a variety of means for holding tape 22.

Tape transport system 20 also includes a carrier ribbon assembly, shown generally by 34. Carrier ribbon assembly 34 includes carrier ribbon 36 driven around ribbon rollers 38 by ribbon drive 40. Ribbon drive 40 may be, for example, an electric motor as is known in the art of tape transport systems. Carrier ribbon 36 is positioned by at least one ribbon guide 42 near a contact region, one of which is indicated by 44, where tape 22 is in contact with carrier ribbon 36. Each ribbon guide 42 includes a channel into which fits tape 22 and carrier ribbon 36. Tape 22 may be driven past tape head 24 by carrier ribbon 36.

In an embodiment of the present invention, tape transport system 20 includes a mechanism, such as lift-off pins 46, for moving tape 22 and carrier ribbon 36 away from tape head 24 during rewind, fast forward, or other high speed movement of tape 22. Various means for moving tape 22 and carrier ribbon 26 away from tape head 24 are described with regards to FIGS. 4 and 5 below.

Carrier ribbon 36 is shown as a continuous loop in FIG. 1. In an alternative embodiment, carrier ribbon 36 may be wound between two reels in a manner similar to tape 22 and reels 32.

To assist in threading tape transport system 20, carrier ribbon assembly 34 may be moved away from head 24. Alternatively, or in addition, head 24 may be moved away from carrier ribbon assembly 34.

Figure 2:
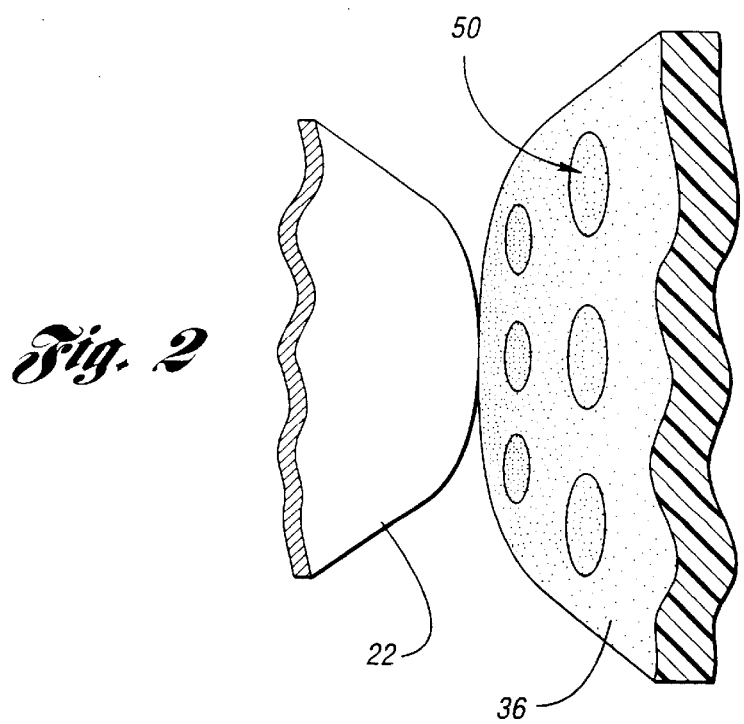
FIG. 2 is a drawing of a carrier ribbon according to an embodiment of the present invention.

Referring now to FIG. 2, a drawing of a carrier ribbon according to an embodiment of the present invention. Carrier ribbon 36 includes openings such as, for example, holes, one of which is indicated by 50, through which air may pass. These openings permit air which would otherwise be trapped between magnetic tape 22 and carrier ribbon 36 to pass through the carrier ribbon. These openings also reduce suction between tape 22 and carrier ribbon 36 upon separation. In addition to or instead of holes 50, carrier ribbon 36 may be woven with openings through which air may pass or may be manufactured from a porous material.

Carrier ribbon 36 may be manufactured from a variety of engineering polymers such as, for example, Mylar or a weave including fibers of a polyester core coated with urethane. The width of carrier ribbon 36 is equal to the width of tape 22. Thin tape 22 typically has a thickness between 5 and 15 microns. Hence, carrier ribbon 36 must be thick enough to provide adequate support. The exact thickness depends, in part, on the material used. A preferred thickness is approximately 635 microns.

Figure 3:
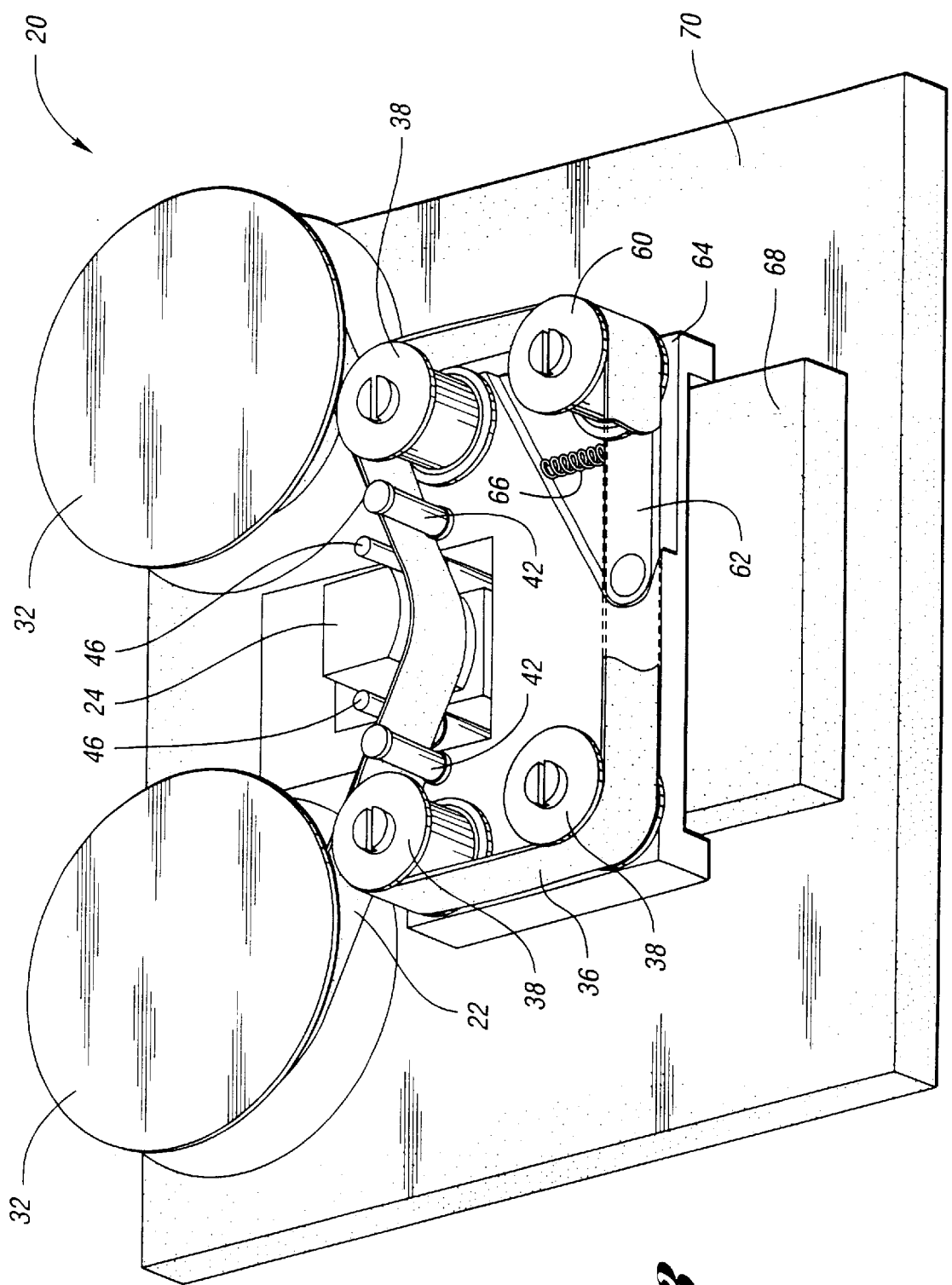
FIG. 3 is a detailed drawing of a tape transport system according to an embodiment of the present invention.

Referring now to FIG. 3, a detailed drawing of a tape transport system according to an embodiment of the present invention is shown. Carrier ribbon assembly 34 includes tensioning roller 60 rotationally mounted on arm 62. Arm 62 is pivotally hinged to carrier ribbon assembly plate 64. Spring 66 between arm 62 and plate 64 provides tensioning pressure on carrier ribbon 36.

Rollers 38, 60 and guides 42 are mounted to carrier ribbon assembly plate 64. Guide 68, attached to base plate 70, permits carrier ribbon assembly plate 64 to slide away from head 24 for threading tape 22.

Figure 4:
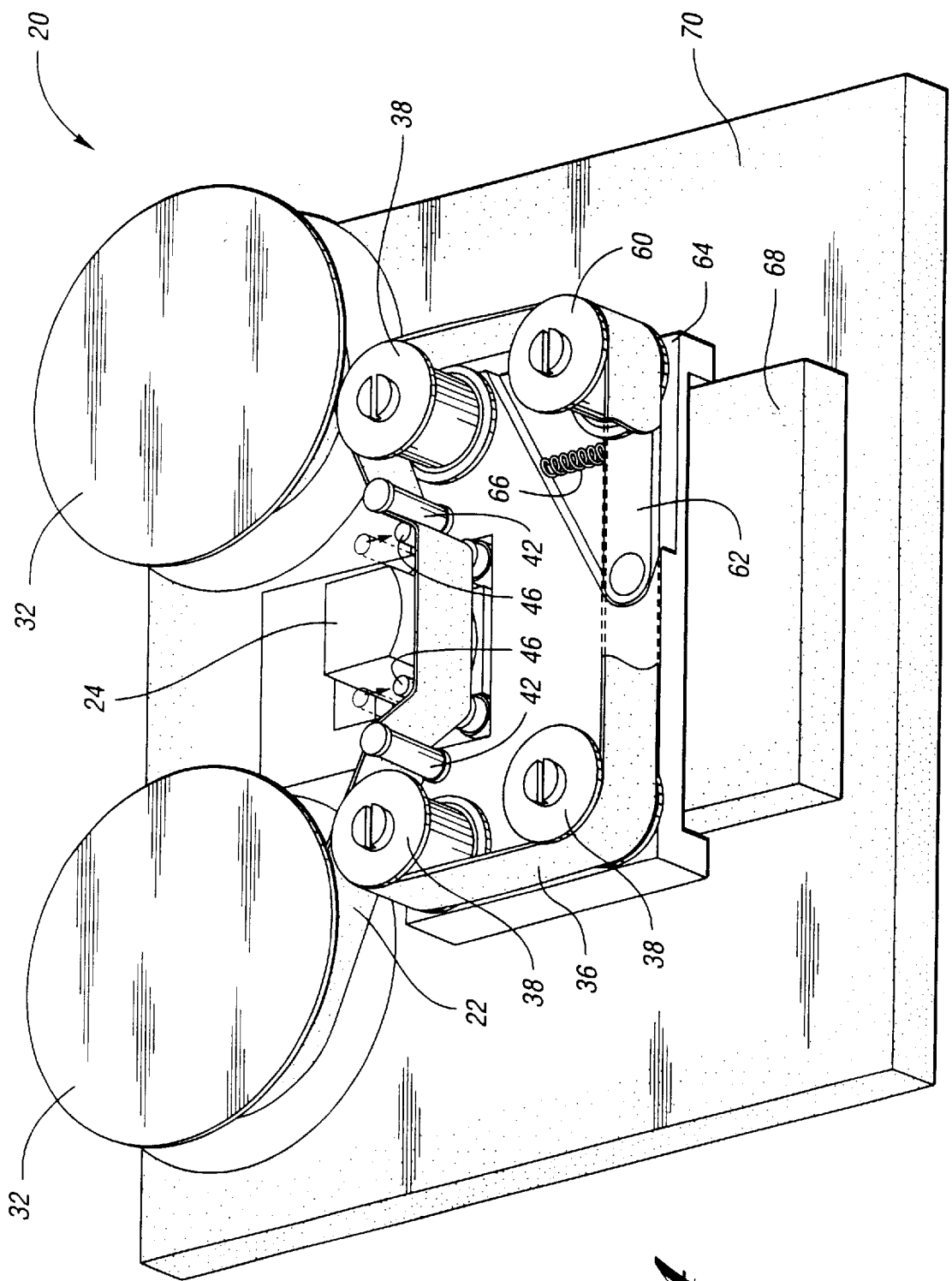
FIG. 4 is a detailed drawing of a tape transport system with the magnetic tape and carrier ribbon moved away from the tape head by lift-off pins.

Referring now to FIG. 4, a detailed drawing of a tape transport system with the magnetic tape and carrier ribbon moved away from the tape head by lift-off pins is shown. Lift-off pins 46 move along the sides of tape head 24 towards tape 22 and carrier ribbon 36 until lift-off pins 46 contact tape 22. Lift-off pins 46 then push tape 22 and carrier ribbon 36 away from tape head 24. This reduces the friction on tape 22 during high speed tape movement such as, for example, during rewind and fast forward operations.

Figure 5:
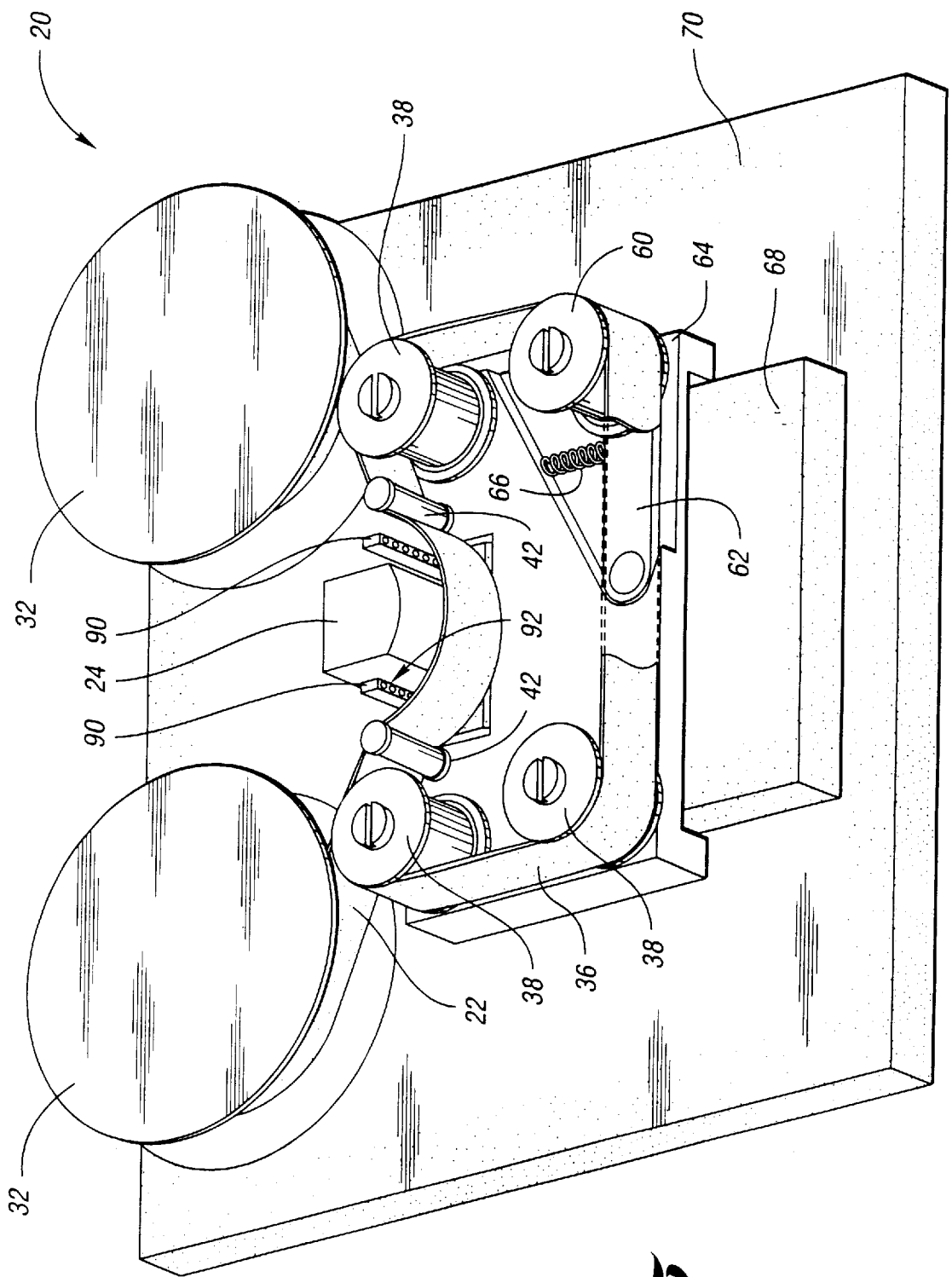
FIG. 5 is a detailed drawing of a tape transport system with the magnetic tape and carrier ribbon moved away from the tape head using air jet nozzles.

Referring now to FIG. 5, a detailed drawing of a tape transport system with the magnetic tape and carrier ribbon moved away from the tape head using air jet nozzles is shown. Tape system 20 includes air jet nozzles 90 which can force air through openings, one of which is indicated by 92, onto tape 22. This builds a cushion of air between tape 22 and tape head 24, forcing tape 22 and carrier ribbon 36 away from tape head 24. Air from nozzles 90 reduces the friction on tape 22 during high speed tape movement.

While embodiments of the invention have been illustrated and described, it is not intended that these embodiments illustrate and describe all possible forms of the invention. Rather, it is intended that the following claims cover all modifications and alternative designs, and all equivalents, that fall within the spirit and scope of this invention.

What is claimed is:

1. A tape transport system for positioning magnetic tape moving at a tape speed over a tape head, the magnetic tape having an active side that may be written on and read from by the tape head and a passive side opposite the active side, the active and passive sides defining a tape width, the system comprising:

a carrier ribbon having a width equal to the tape width, the carrier ribbon operative to contact the magnetic tape passive side, the carrier ribbon defining passages through the carrier ribbon, the passages permitting air to pass through the carrier ribbon;

at least one carrier ribbon guide on either side of the tape head in a tape direction, each carrier ribbon guide comprising a channel of substantially the same width as the carrier ribbon, each carrier ribbon guide positioning the magnetic tape across the tape head;

a carrier ribbon drive operative to move the carrier ribbon past the carrier ribbon guides; and at least one air jet nozzle operative to move the magnetic tape and the carrier ribbon away from the tape head.

2. A tape transport system as in claim 1 wherein the carrier ribbon is formed in a continuous loop.

3. A tape transport system as in claim 1 wherein the carrier ribbon is operative to drive the magnetic tape at the tape speed past the tape head.

4. A tape transport system as in claim 1 further comprising a carrier ribbon tensioner operative to maintain substantially constant tension on the carrier ribbon.

5. A tape transport system as in claim 1 further comprising at least one lift-off pin operative to move the magnetic tape and the carrier ribbon away from the tape head.

6. A method of transporting magnetic tape in a tape direction past a tape head comprising:

driving a carrier ribbon in the tape direction;

contacting the tape with the carrier ribbon, the tape contacted in a region of a tape path prior to the tape head in the direction of tape travel;

passing any air that would otherwise be trapped between the magnetic tape and the carrier ribbon through the carrier ribbon;

guiding the magnetic tape past the tape head with at least one carrier ribbon guide having a channel of substantially the same width as the carrier ribbon;

separating the tape from the carrier ribbon in a region of the tape path after the tape head; and building a cushion of air between the magnetic tape and the tape head to permit rapid tape movement of the magnetic tape past the tape head.

7. A method of transporting magnetic tape as in claim 6 further comprising forming the carrier ribbon as a continuous loop.

8. A method of transporting magnetic tape as in claim 6 wherein driving the carrier ribbon comprises driving the carrier ribbon at the same velocity as the tape.

9. A method of transporting magnetic tape as in claim 6 further comprising maintaining substantially constant tension on the carrier ribbon.

10. A method of transporting magnetic tape as in claim 6 further comprising moving the carrier ribbon and the magnetic tape away from the tape head for high speed tape travel.

11. A system for guiding magnetic tape past a tape head in a tape direction comprising:

- a carrier ribbon comprising passages permitting air to pass through the carrier ribbon;
- means for driving the carrier ribbon in the tape direction;
- means for contacting the magnetic tape in a region prior to the tape head in the direction of tape travel;
- means for separating the magnetic tape from the carrier ribbon in a region after the tape head in the direction of tape travel;
- at least one carrier ribbon guide having a channel of substantially the same width as the carrier ribbon, each carrier ribbon guide positioning the magnetic tape across the tape head; and
- means for building a cushion of air between the magnetic tape and the tape head.

12. A system for guiding magnetic tape past a tape head as in claim 11 wherein the carrier ribbon is formed as a continuous loop.

13. A system for guiding magnetic tape past a tape head as in claim 11 further comprising means for tensioning the carrier ribbon.

14. A system for guiding magnetic tape past a tape head as in claim 11 further comprising moving the carrier ribbon and the magnetic tape away from the tape head for high speed tape travel.

15. A method of transporting magnetic tape in a tape direction past a tape head comprising:

- driving a carrier ribbon in the tape direction;
- contacting the tape with the carrier ribbon, the tape contacted in a region of a tape path prior to the tape head in the direction of tape travel;
- guiding the magnetic tape past the tape head;
- separating the tape from the carrier ribbon in a region of the tape path after the tape head; and
- building a cushion of air between the magnetic tape and the tape head during high speed tape movement.

* * * * *